United States Patent
You et al.

(10) Patent No.: US 12,149,277 B2
(45) Date of Patent: Nov. 19, 2024

(54) ANTENNA APPARATUS, COMMUNICATION PRODUCT, AND ANTENNA PATTERN RECONSTRUCTION METHOD

(71) Applicant: Huawei Technologies Co., Ltd., Shenzhen (CN)

(72) Inventors: Jiaqing You, Shanghai (CN); Jikang Wang, Shanghai (CN); Laiwei Shen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 336 days.

(21) Appl. No.: 17/641,380

(22) PCT Filed: Aug. 25, 2020

(86) PCT No.: PCT/CN2020/111012
§ 371 (c)(1),
(2) Date: Mar. 8, 2022

(87) PCT Pub. No.: WO2021/047385
PCT Pub. Date: Mar. 18, 2021

(65) Prior Publication Data
US 2022/0416834 A1  Dec. 29, 2022

(30) Foreign Application Priority Data

Sep. 12, 2019 (CN) .......................... 201910866772.6

(51) Int. Cl.
*H04B 1/401* (2015.01)
*H01Q 1/22* (2006.01)
(Continued)

(52) U.S. Cl.
CPC ........... *H04B 1/401* (2013.01); *H01Q 1/2291* (2013.01); *H01Q 1/243* (2013.01); *H01Q 1/48* (2013.01);
(Continued)

(58) Field of Classification Search
CPC ........ H01Q 1/2291; H01Q 1/243; H01Q 1/48; H01Q 1/50; H01Q 13/103; H01Q 25/00;
(Continued)

(56) References Cited

U.S. PATENT DOCUMENTS 9,472,850 B2    10/2016  Chiu
11,670,837 B2 *  6/2023  Wu .......................... H01Q 9/42
                                                      343/702
(Continued)

FOREIGN PATENT DOCUMENTS

CN     104852144 A    8/2015
CN     105932420 A    9/2016
(Continued)

*Primary Examiner* — Tan H Trinh
(74) *Attorney, Agent, or Firm* — Conley Rose, P.C.

(57) ABSTRACT

An antenna apparatus having an antenna. The antenna comprises a first radiator section and a second radiator section coupled to each other, and a third radiator section, a fourth radiator section, and a fifth radiator section that are distributed on a same side of the first and second radiator sections, wherein the third radiator section is coupled to a junction of the first and second radiator sections and is grounded, and the fourth and fifth radiator sections are separately disposed on two sides of the third radiator section, wherein the fourth radiator section is grounded by a first switch, and the fifth radiator section is grounded by a second switch.

20 Claims, 15 Drawing Sheets

(51) Int. Cl.
*H01Q 1/24* (2006.01)
*H01Q 1/48* (2006.01)
*H01Q 1/50* (2006.01)
*H01Q 13/10* (2006.01)
*H01Q 25/00* (2006.01)
*H04B 17/318* (2015.01)

(52) U.S. Cl.
CPC ............ *H01Q 1/50* (2013.01); *H01Q 13/103* (2013.01); *H01Q 25/00* (2013.01); *H04B 17/318* (2015.01)

(58) Field of Classification Search
CPC .......... H01Q 3/24; H01Q 5/328; H01Q 5/364; H01Q 9/42; H04B 1/16; H04B 1/401; H04B 17/318
USPC ........................................................ 455/73
See application file for complete search history.

(56) References Cited

U.S. PATENT DOCUMENTS

| | | | |
|---|---|---|---|
| 2002/0126052 A1* | 9/2002 | Boyle | H01Q 1/243 343/702 |
| 2006/0194562 A1* | 8/2006 | Marrah | H04H 40/90 455/334 |
| 2007/0224949 A1* | 9/2007 | Morton | H01Q 3/247 455/562.1 |
| 2009/0015498 A1 | 1/2009 | Deng et al. | |
| 2011/0038429 A1* | 2/2011 | Sako | H04B 7/0617 333/32 |
| 2013/0010842 A1* | 1/2013 | Alexopoulos | H01Q 21/24 343/895 |
| 2014/0191923 A1 | 7/2014 | Oh | |
| 2014/0349595 A1* | 11/2014 | Cox | H04B 1/525 455/78 |
| 2015/0102962 A1* | 4/2015 | Ellgardt | H01Q 25/00 342/368 |
| 2015/0194736 A1* | 7/2015 | Diukman | H01Q 1/48 343/821 |
| 2015/0244404 A1* | 8/2015 | Liu | H04B 1/006 455/234.1 |
| 2017/0279185 A1 | 9/2017 | Hung et al. | |
| 2018/0090816 A1 | 3/2018 | Mow et al. | |
| 2018/0351239 A1 | 12/2018 | Asrani et al. | |
| 2019/0044231 A1 | 2/2019 | Zaric | |
| 2019/0181552 A1* | 6/2019 | Lee | H01Q 3/247 |
| 2019/0181555 A1 | 6/2019 | Lee et al. | |
| 2019/0348762 A1* | 11/2019 | Chou | H01Q 5/328 |
| 2020/0373669 A1 | 11/2020 | Xue et al. | |
| 2023/0318180 A1* | 10/2023 | Lan | H01Q 1/243 343/702 |

FOREIGN PATENT DOCUMENTS

| | | |
|---|---|---|
| CN | 107069219 A | 8/2017 |
| CN | 107230825 A | 10/2017 |
| CN | 108270087 A | 7/2018 |
| CN | 108631800 A | 10/2018 |
| CN | 109687141 A | 4/2019 |
| CN | 110137681 A | 8/2019 |
| EP | 2219265 A1 | 8/2010 |
| EP | 2297973 B1 | 3/2016 |
| WO | 2019090690 A1 | 5/2019 |

\* cited by examiner

ANTENNA APPARATUS, COMMUNICATION PRODUCT, AND ANTENNA PATTERN RECONSTRUCTION METHOD

CROSS-REFERENCE TO RELATED APPLICATIONS

This is a U.S. National Stage of International Patent Application No. PCT/CN2020/111012 filed on Aug. 25, 2020, which claims priority to Chinese Patent Application No. 201910866772.6 filed on Sep. 12, 2019, both of which are hereby incorporated by reference in their entireties.

TECHNICAL FIELD

This application relates to the field of communication technologies, and in particular, to a design of an antenna apparatus and a pattern reconstruction method.

BACKGROUND

With development of communication technologies, to bring a more comfortable visual effect to users of mobile terminals, a full-screen design becomes a current mainstream trend of the mobile terminals. The full-screen design corresponds to a very large screen-to-body ratio, causing a sharp decrease in design space left by a communication product (especially a mobile phone) to an antenna apparatus. However, a size, bandwidth, and efficiency of the antenna apparatus are associated with each other and affect each other. If the size (space) of the antenna apparatus is reduced, an efficiency bandwidth product of the antenna apparatus is certainly reduced, and a capability of performing reception from a base station by the antenna apparatus is also reduced.

SUMMARY

To overcome a problem that a pattern of an antenna apparatus is excessively centralized in a case of a reduced clearance, the present application provides an antenna apparatus, an antenna pattern reconstruction method, and a communication product.

According to a first aspect, this application provides an antenna apparatus. The antenna apparatus includes an antenna unit, including a first radiator section and a second radiator section that are collinear and connected to each other and a third radiator section, a fourth radiator section, and a fifth radiator section that are distributed on a same side of the first radiator section and the second radiator section and that extend at an included angle from the first radiator section and the second radiator section, where the third radiator section is connected to a junction of the first radiator section and the second radiator section and is grounded, and the fourth radiator section and the fifth radiator section are separately disposed on two sides of the third radiator section and are grounded; a feed source, electrically connected to the fourth radiator section to feed the antenna unit to obtain a common mode and a differential mode; and a control unit, electrically connected to the feed source, and is configured to perform switching between the common mode and the differential mode. The control unit controls a working mode of the antenna unit, so that the working mode is switched based on an environment, thereby implementing pattern reconstruction and improve a signal receiving capability of the antenna apparatus.

Specifically, the control unit is configured to: identify a common-mode received signal strength of the antenna unit in the common mode and a differential-mode received signal strength in the differential mode, compare the common-mode received signal strength and the differential-mode received signal strength, and obtain a working mode switching signal based on a comparison result.

With reference to the first aspect, in an implementation, the fourth radiator section is externally connected to a first switch, the fourth radiator section is grounded by the first switch, the fifth radiator section is externally connected to a second switch, and the fifth radiator section is grounded by the second switch. The fourth radiator section and the fifth radiator section are grounded by the first switch and the second switch, so that performance of the antenna apparatus in different working modes is adjusted.

Specifically, the first switch and the second switch include a capacitance adjustment apparatus or an inductance adjustment apparatus, configured to perform frequency tuning of the antenna apparatus. Current distribution inside the antenna unit is adjusted by the capacitance adjustment apparatus or the inductance adjustment apparatus inside the first switch and the second switch, so that frequency tuning is implemented, and a band coverage range of the antenna apparatus is changed.

With reference to the first aspect, a slot is disposed at an end that is of the first radiator section and that is away from the second radiator section and/or an end that is of the second radiator section and that is away from the first radiator section, to excite the common mode and the differential mode. The slot is disposed to adjust a proportion of the common mode to the differential mode, to optimize patterns when the two modes coincide and improve a communication signal receiving capability of the antenna apparatus in a hemispherical area in which the antenna apparatus works.

According to a second aspect, this application provides an antenna pattern reconstruction method, to improve a capability of performing reception from a base station by an antenna apparatus. The antenna pattern reconstruction method provided in this application includes the following steps: First, a communication signal is received by an antenna unit of the antenna apparatus, and the communication signal is fed back to a control unit, where the antenna apparatus includes one feed source that feeds the antenna unit to obtain a common mode and a differential mode. Then the control unit transmits a working mode switching signal to the antenna unit based on the feedback communication signal. Finally, the antenna unit switches a working mode based on the working mode switching signal. In the antenna pattern reconstruction method, the communication signal around the antenna apparatus is collected, and the working mode of the antenna apparatus is switched based on the communication signal, to obtain a preferred pattern, so that a communication signal receiving capability of the antenna apparatus is improved.

Specifically, in an implementation, after receiving the communication signal, the control unit identifies a common-mode received signal strength of the antenna unit in the common mode and a differential-mode received signal strength in the differential mode. The control unit compares the common-mode received signal strength and the differential-mode received signal strength. The control unit obtains the working mode switching signal based on a comparison result. After receiving the communication signal, the antenna apparatus transmits the communication signal to the control unit. The control unit simulates received signal strengths of the antenna apparatus in different modes based on the communication signal, and compares the two received signal strengths to select a better working mode, so that a communication signal receiving capability of the antenna apparatus is improved.

With reference to the second aspect, in an implementation, when the common-mode received signal strength is greater than the differential-mode received signal strength, the antenna apparatus selects the common mode, and the control unit transmits a common-mode switching signal; or when the common-mode received signal strength is less than the differential-mode received signal strength, the antenna apparatus selects the differential mode, and the control unit transmits a differential-mode switching signal. For the two working modes of the antenna apparatus, namely, the common mode and the differential mode, the received signal strengths are different for the two different working modes. When the common-mode received signal strength is greater than the differential-mode received signal strength, it indicates that in this case, a communication signal obtained by the antenna apparatus in the common mode is stronger, and the control unit transmits the common-mode switching signal, so that the antenna apparatus selects the working mode named the common mode. When the common-mode received signal strength is less than the differential-mode received signal strength, it indicates that in this case, a communication signal obtained by the antenna apparatus in the differential mode is stronger, and the control unit transmits the differential-mode switching signal, so that the antenna apparatus selects the working mode named the common mode.

With reference to the second aspect, in an implementation, after obtaining the working mode switching signal, the antenna apparatus implements frequency tuning by a switch of the antenna apparatus. When the antenna apparatus selects a working mode under control of the control unit, the antenna apparatus can perform frequency tuning by controlling the switch of the antenna apparatus, to change a band coverage range of the antenna apparatus.

With reference to the second aspect, in an implementation, a pattern a when the antenna apparatus uses the common mode and a pattern b when the antenna apparatus uses the differential mode are spatially orthogonal and complementary. Directions of strongest power in the pattern a of the antenna apparatus in the common mode and the pattern b in the differential mode are perpendicular to each other and spatially complementary, in other words, the two can more comprehensively cover a hemispherical area in which an antenna works.

With reference to the second aspect, in an implementation, the antenna apparatus feeds back the communication signal to the control unit at every interval of a fixed time, so that the control unit determines selection of the working mode at every interval of the fixed time, to implement polling switching of the antenna apparatus. In a working scenario of the antenna apparatus, an external communication signal constantly changes. Therefore, the control unit needs to constantly select a working mode based on an obtained communication signal. In this way, polling switching of the antenna apparatus is implemented, so that the antenna apparatus has an optimal solution all the time in terms of working mode selection.

According to a third aspect, the present application provides a communication device. The communication device includes a circuit board, a battery, a control unit, and the antenna apparatus mentioned in the foregoing embodiments. A working mode of the antenna apparatus is switched by the control unit, to obtain an antenna pattern with a wider coverage area and a stronger receiving capability, so that a capability of performing information transmission with a base station by the communication device is improved.

DESCRIPTION OF EMBODIMENTS

The following clearly describes specific implementations of this application with reference to the accompanying drawings.

With emergence of a full-screen design, there is a sharp decrease in design space left by a communication device (especially a mobile phone) to an antenna apparatus. How to maintain a good signal receiving capability in smaller design space is a mainstream direction of research and development of the antenna apparatus.

Figure 1:
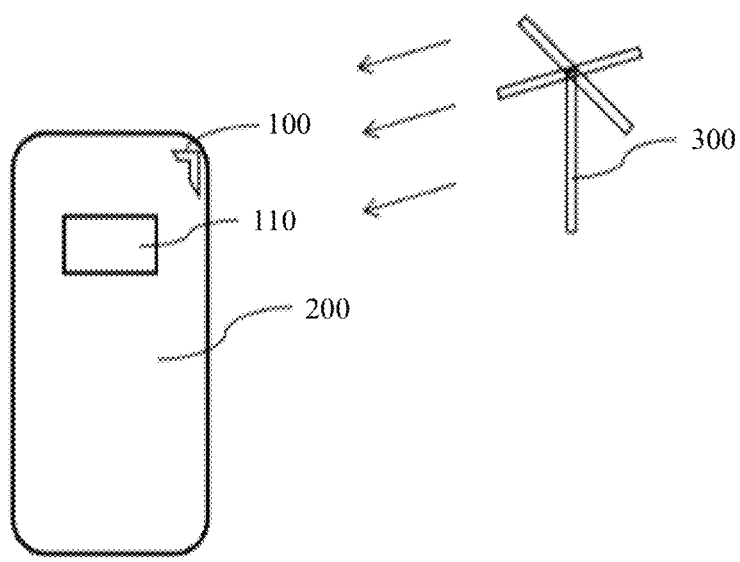
FIG. 1 is a flowchart of an application scenario of an antenna apparatus according to an embodiment of the present invention.

As shown in FIG. 1, a communication device 200 provided in this application includes a circuit board, a battery, a control unit 110, and an antenna apparatus 100 with two working modes named a common mode and a differential mode. The communication device switches a working mode of the antenna apparatus 100 by the control unit 110, to obtain an antenna pattern with a wider coverage area and a stronger receiving capability, so that a capability of performing information transmission with a base station 300 by the communication device 200 is improved.

Figure 2:
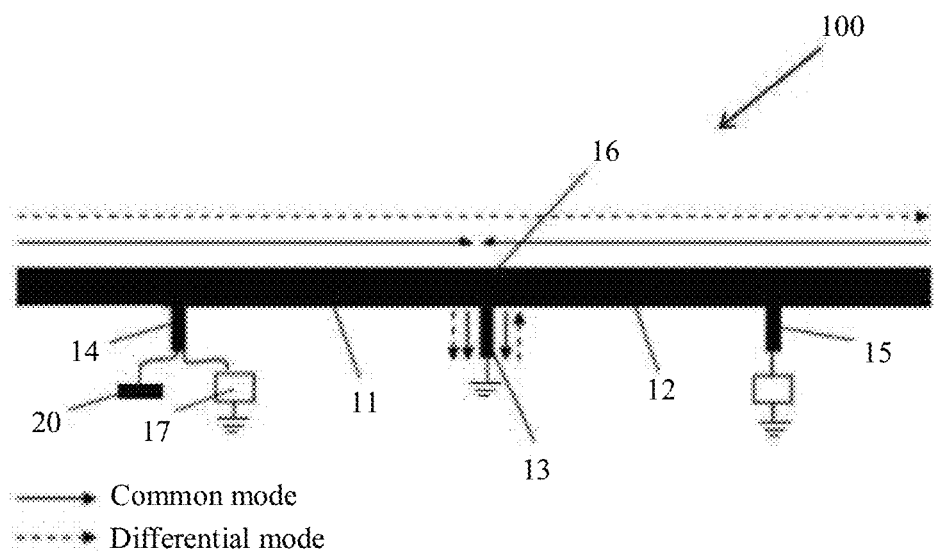
FIG. 2 is a diagram of an antenna topology of an antenna apparatus according to an embodiment of the present invention.

The antenna apparatus provided in the embodiment may reconstruct a pattern by switching the working mode of the antenna apparatus, to improve a communication signal receiving capability. FIG. 2 is a diagram of a topology of the antenna apparatus 100. The antenna apparatus includes an antenna unit, a feed source 20, and a control unit (not shown in the figure). The antenna unit includes a first radiator section 11 and a second radiator section 12 that are connected to each other and a third radiator section 13, a fourth radiator section 14, and a fifth radiator section 15 that are distributed on a same side of the first radiator section 11 and the second radiator section 12 and that extend at an included angle from the first radiator section 11 and the second radiator section 12. The third radiator section 13 is connected to a junction 16 of the first radiator section 11 and the second radiator section 12 and is grounded. The fourth radiator section 14 and the fifth radiator section 15 are separately disposed on two sides of the third radiator section 13 and are grounded. There is one feed source 20, and the feed source 20 is electrically connected to the fourth radiator section 14 and feeds the antenna unit. Through the foregoing design, the antenna apparatus 100 obtains two working modes, namely, a common mode and a differential mode. In a specific embodiment, the antenna unit of the antenna apparatus 100 includes the first radiator section 11 and the second radiator section 12 that are connected to each other. The first radiator section 11 and the second radiator section 12 may be collinear (which is not limited to a straight line, and may include an arc-shaped curve line segment). The first radiator section 11 and the second radiator section 12 may be distributed on a same straight line, or the first radiator section 11 or the second radiator section 12 is arc-shaped. To construct the two working modes named the common mode and the differential mode, the third radiator section 13 is added at a middle position of the antenna unit, namely, the junction 16 of the first radiator section 11 and the second radiator section 12, and is ground. Therefore, when the feed source 20 feeds the antenna unit, current distribution inside the antenna unit brings the two working modes of an antenna.

Specifically, an extension direction of the first radiator section 11 and the second radiator section 12 is a first direction or approximately the first direction, and an extension direction of the third radiator section 13, the fourth radiator section 14, and the fifth radiator section 15 is a second direction. An included angle is formed between the second direction and the first direction, and the second direction may be perpendicular to the first direction. It may be understood that the first radiator section 11 and the second radiator section 12 may be shaped in a straight line segment, and the third radiator section 13, the fourth radiator section 14, and the fifth radiator section 15 may be perpendicular to the first radiator section 11 and the second radiator section 12.

A slot is disposed at an end that is of the first radiator section 11 and that is away from the second radiator section 12 and/or an end that is of the second radiator section 12 and that is away from the first radiator section 11, to excite the common mode and the differential mode. The antenna apparatus provided in this application may include one slot, and disposing the slot enables a free end to be formed at the first radiator section 11 or a free end to be formed at a second radiator section 12. Alternatively, two slots may be included, and disposing the slots enables a free end to be formed at each of the first radiator section 11 and the second radiator section 12.

Specifically, current directions of the antenna unit can be seen from FIG. 2: In FIG. 2, a direction of a solid line arrow is a direction of a current inside the antenna unit in the common mode, and a direction of a dashed line arrow is a direction of a current inside the antenna unit in the differential mode. In the common mode, through feeding of the feed source 20, a common-mode current direction of the first radiator section 11 is in the first direction from the first radiator section 11 to the second radiator section 12, a common-mode current direction of the second radiator section 12 is in the second direction from the second radiator section 12 to the first radiator section 11, and a common-mode current direction of the third radiator section 13 is in a third direction from the junction 16 to a ground terminal of the third radiator section 13. In the differential mode, through feeding of the feed source 20, a differential-mode current direction of the first radiator section 11 is in the first direction from the first radiator section 11 to the second radiator section 12, a differential-mode current direction of the second radiator section 12 is in the first direction from the first radiator section 11 to the second radiator section 12, and a differential-mode current direction of the third radiator section 13 includes the third direction from the junction to the ground terminal of the third radiator section 13 and a fourth direction from the ground terminal of the third radiator section 13 to the junction 16.

In a specific embodiment, a length of the antenna unit is 30 mm, lengths of both the first radiator section 11 and the second radiator section 12 are 15 mm, the third radiator section 13 is located at the junction 16 of the first radiator section 11 and the second radiator section 12, a distance between the fourth radiator section 14 and an end of the first radiator section 11 is 7 mm, and a distance between the fifth radiator section 15 and an end of the second radiator section 12 is 7 mm.

It should be noted that, in this embodiment, the feed source 20 may be alternatively electrically connected to the fifth radiator section 15. It can be learned from FIG. 2 that the fourth radiator section 14 and the fifth radiator section 15 are symmetrically distributed on two sides of the junction of the first radiator section 11 and the second radiator section 12. Therefore, the feed source 20 may be disposed on the fourth radiator section 14, or may be disposed on the fifth radiator section 15. When the feed source 20 is disposed on the fifth radiator section 15, in the common mode, current directions of the antenna unit remain unchanged, to be specific, a common-mode current direction of the first radiator section 11 is in the first direction from the first radiator section 11 to the second radiator section 12, a common-mode current direction of the second radiator section 12 is in the second direction from the second radiator section 12 to the first radiator section 11, and a common-mode current direction of the third radiator section 13 is in the third direction from the junction 16 to the ground terminal of the third radiator section 13. In the differential mode, current directions of the antenna unit change, to be specific, a differential-mode current direction of the first radiator section 11 is in the second direction from the second radiator section 12 to the first radiator section 11, a differential-mode current direction of the second radiator section 12 is in the second direction from the second radiator section 12 to the first radiator section 11, and a differential-mode current direction of the third radiator section 13 includes the third direction from the junction to the ground terminal of the third radiator section 13 and the fourth direction from the ground terminal of the third radiator section 13 to the junction 16.

In a specific embodiment, as shown in FIG. 2, the fourth radiator section 14 is externally connected to a first switch 17, the fourth radiator section 14 is grounded by the first switch 17, the fifth radiator section 15 is externally connected to a second switch 18, and the fifth radiator section 15 is grounded by the second switch 18. The fourth radiator section 14 and the fifth radiator section 15 are grounded by the first switch 17 and the second switch 18, so that performance of the antenna apparatus 100 in different working modes is adjusted.

Specifically, the first switch 17 and the second switch 18 include a capacitance adjustment apparatus or an inductance adjustment apparatus, configured to perform frequency tuning of the antenna apparatus. Current distribution inside the antenna unit is adjusted by the capacitance adjustment apparatus and the inductance adjustment apparatus inside the first switch 17 and the second switch 18, so that frequency tuning is implemented, and a band coverage range of the antenna apparatus is changed.

To better describe current directions and pattern distribution of the antenna device in the common mode (C mode) and the differential mode (D mode) in the embodiments, a mobile phone is used as an example. Refer to FIG. 3a, FIG. 3b, FIG. 4a, and FIG. 4b together.

Figure 3A:
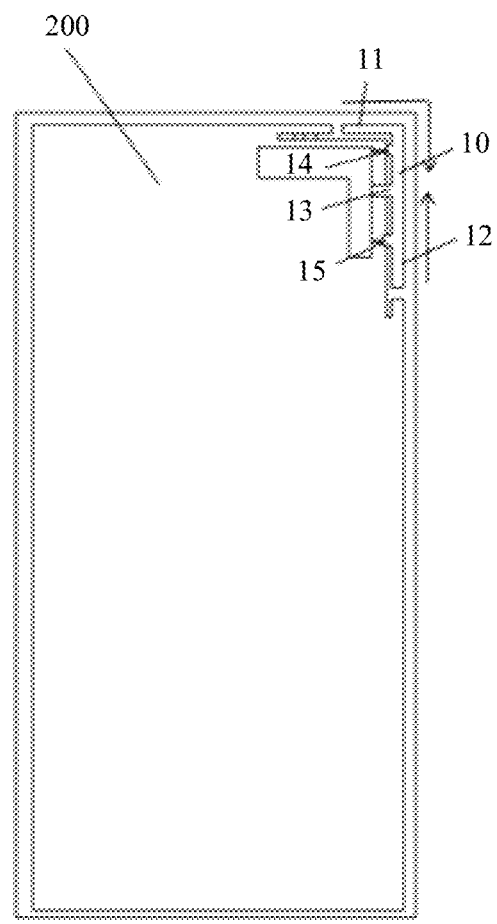
FIG. 3a is a diagram of a structure of an antenna apparatus in a common mode according to an embodiment.
Figure 3B:
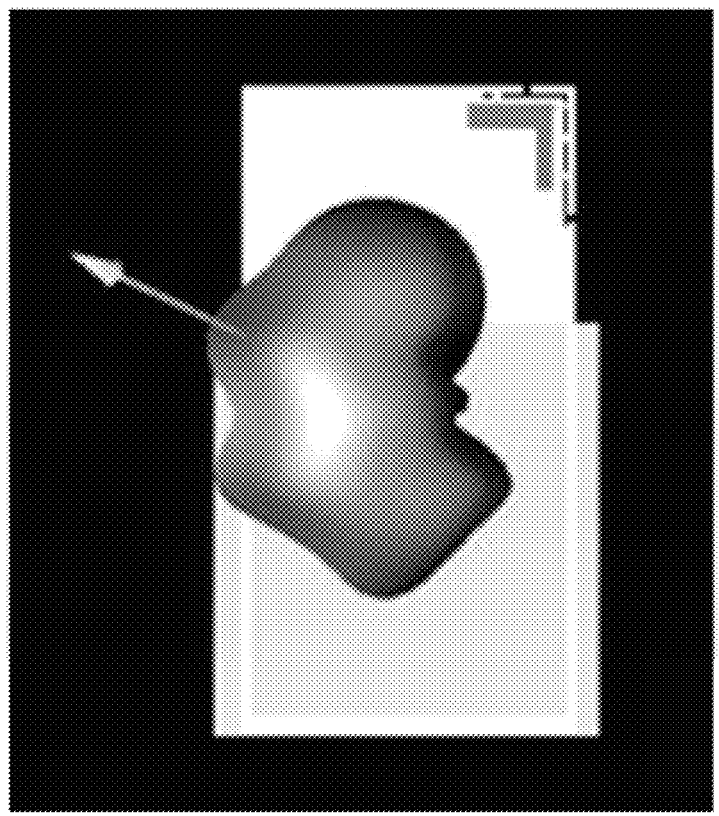
FIG. 3b is an antenna pattern of an antenna apparatus in a common mode according to an embodiment.
Figure 4A:
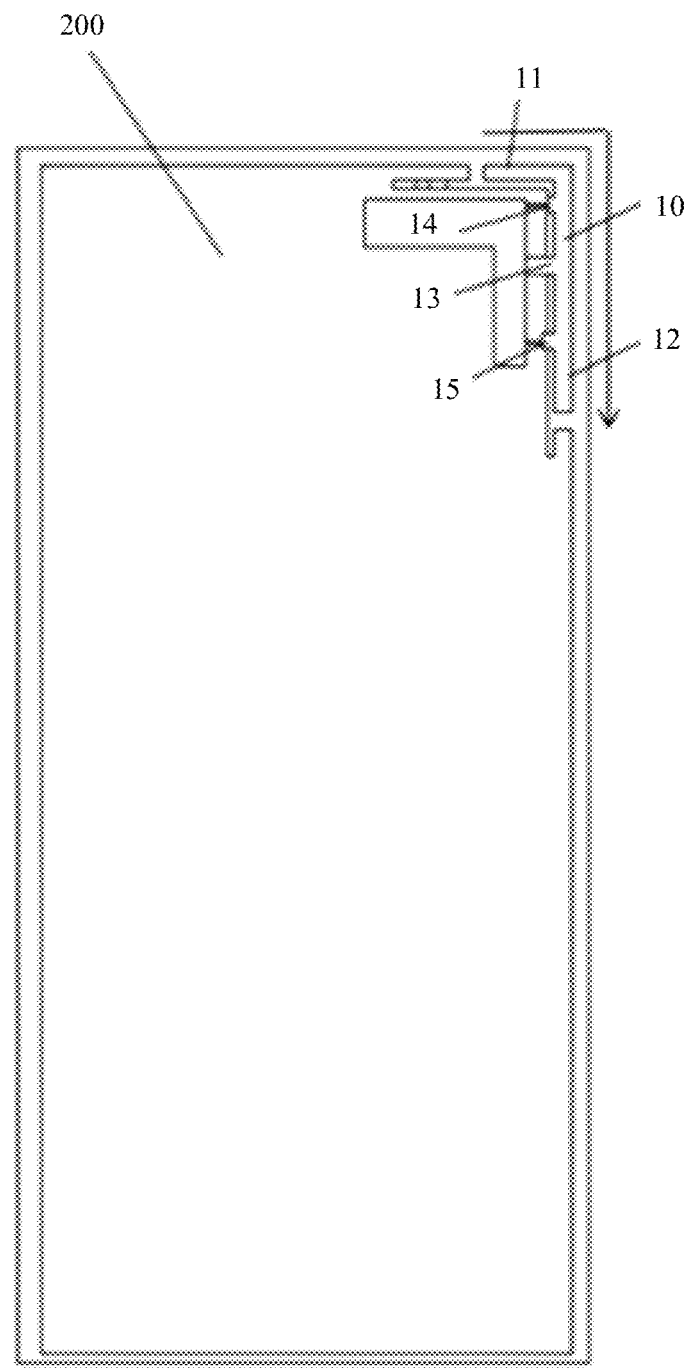
FIG. 4a is a diagram of a structure of an antenna apparatus in a differential mode according to an embodiment.
Figure 4B:
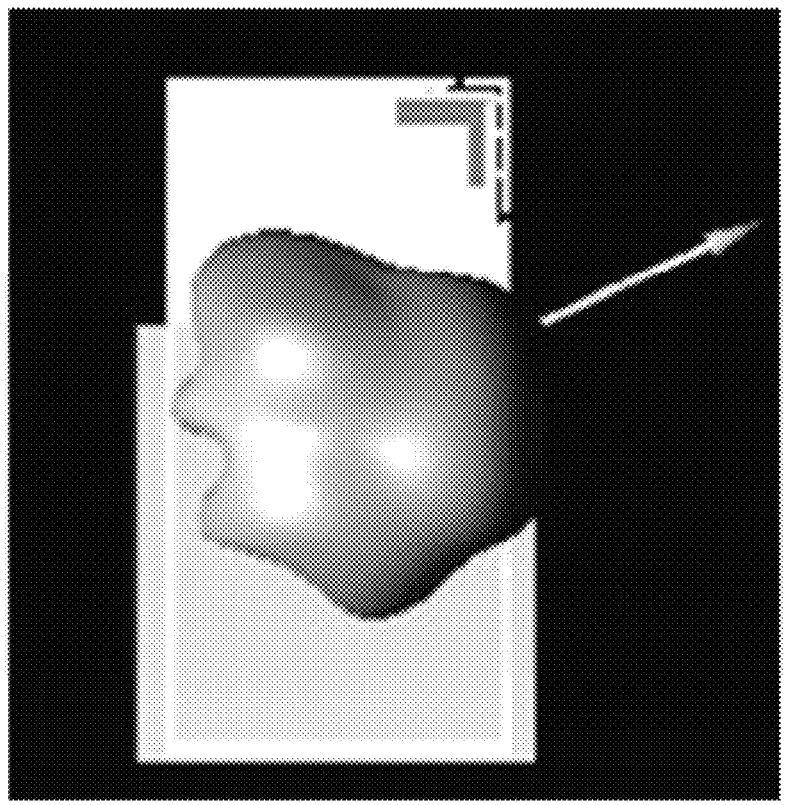
FIG. 4b is an antenna pattern of an antenna apparatus in a differential mode according to an embodiment.

An antenna apparatus in FIG. 3a is disposed at an upper right corner of the mobile phone (the communication device 200). In this case, to match a corner position and shape of the mobile phone, an antenna is also designed as an L-shaped antenna. The first radiator section 11 is a bent section, and the second radiator section 12 connected to the first radiator section 11 is shaped in a straight strip. Correspondingly, three other radiators are disposed on edges that are of the first radiator section 11 and the second radiator section 12 and that are close to the inside of the mobile phone: the third radiator section 13, the fourth radiator section 14, and the fifth radiator section 15. The three radiators are all grounded. When the control unit enables the antenna device to choose to work in the common mode, current directions of the antenna unit are shown by arrows: A common-mode current direction of the first radiator section 11 is in the first direction from the first radiator section 11 to the second radiator section 12, a common-mode current direction of the second radiator section 12 is in the second direction from the second radiator section 12 to the first radiator section 11, and a common-mode current direction of the third radiator section 13 is in the third direction from the junction 16 to the ground terminal of the third radiator section 13. It can be learned from comparison between FIG. 3a (the common mode) and FIG. 4a (the differential mode) that current directions in the differential mode change. The change of the current directions causes a different antenna pattern. FIG. 3b is an antenna pattern in the common mode, and a direction of an arrow in the figure represents a direction in which radiation and signal reception of the antenna are strongest. FIG. 4b is an antenna pattern in the differential mode, and a direction of an arrow in the figure is obviously different from the direction of the arrow in FIG. 3b.

The antenna apparatus of this application obtains different patterns by switching the working mode, to extend functions of the antenna apparatus in different scenarios. The following describes related applications in detail.

The antenna apparatus provided in this application may be specifically applied to a diversity antenna and an NC antenna. The NC antenna is a near field communication near field communication antenna, and mainly refers to Wi-Fi, Bluetooth, or the like.

A mobile phone is used as an example. For the diversity antenna, the diversity antenna respectively uses a differential mode and a common mode to cover a middle band and a high band (Middle & High Band) of the antenna, to control a change of an antenna pattern, so that scenario-based mode switching is covered. Therefore, antenna performance in a hand mode is improved, and a user experience effect is good. Patterns of the differential mode and the common mode are different. When the differential mode and the common mode are separately used in a same band, spatial energy of the differential mode and the common mode can be complementary. Therefore, radiation performance of an upper part of the mobile phone is improved.

In a specific operation, as shown in FIG. 3b and FIG. 4b, the two figures separately represent a pattern of the antenna unit in the common mode (FIG. 3b) and a pattern of the antenna unit in the differential mode (FIG. 4b) in the embodiments. As an indicator describing an antenna field type, the antenna pattern shows a spatial distribution status of energy radiation and reception of the antenna. The pattern in FIG. 3b in this embodiment is used as an example. It can be learned that there is a sharp projection (an angle indicated by an arrow) on an upper left part of the pattern. A direction of the projection indicates that energy is most concentrated in the direction, and also represents a direction of the antenna. In other words, in the common mode, a capability of receiving a signal of a base station by the antenna apparatus is strongest in a direction indicated by the arrow. Similarly, in the differential mode, there is a sharp projection (an angle indicated by an arrow) on an upper right part of the pattern (FIG. 4b), to indicate that in the differential mode, a capability of receiving a signal of the base station by the antenna apparatus is strongest in a direction indicated by the arrow. Therefore, when signal distribution around the antenna device changes, the change is learned by the control unit through analysis by a communication signal, and then the control unit selects a more suitable working mode based on a signal distribution status. For example, when the control unit learns through analysis that distribution of the antenna device is strong in the direction of the arrow in the pattern (FIG. 3b), the control unit enables the antenna unit to use the working mode named the common mode, to improve a communication signal receiving capability of the antenna apparatus.

Figure 5:
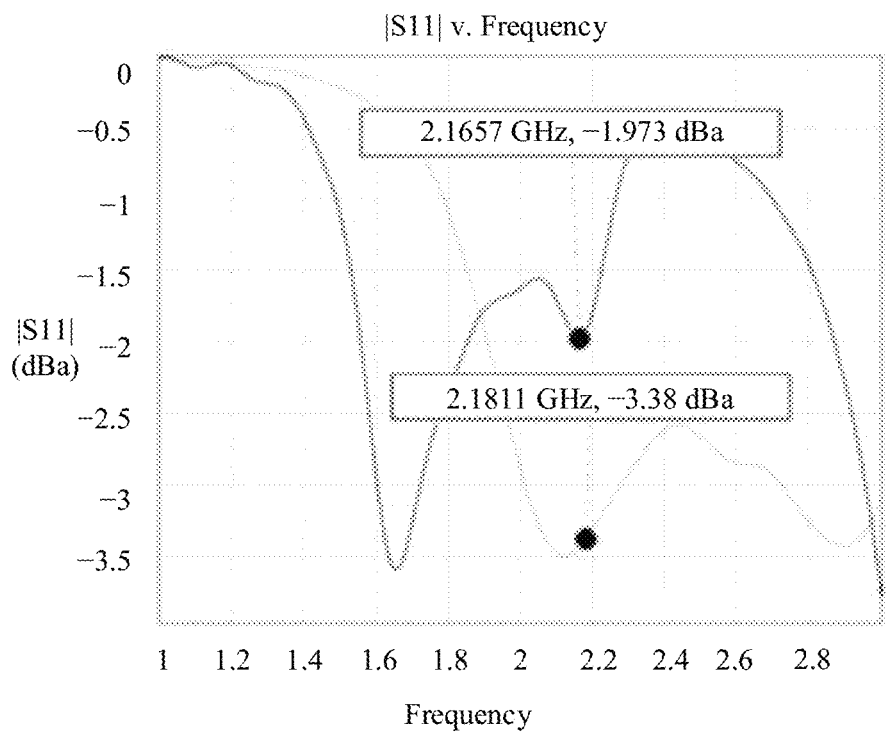
FIG. 5 is a diagram of a gain of an antenna apparatus according to an embodiment of the present invention.

FIG. 5 is a diagram of status simulation of the antenna device applied to a band 1 (1.9 GHz to 2.1 GHz). It can be learned that adjustment of 1.7 GHz to 2.7 GHz can be implemented by two modes, in other words, the antenna device can fully cover a middle band (B1/B3) and a high band (B40/B7) in the two modes.

For the NC antenna, the antenna apparatus provided in this application can improve side-button hemispherical directivity (landscape mode) of a GPS and Wi-Fi landscape-mode holding with a hand.

Figure 6:
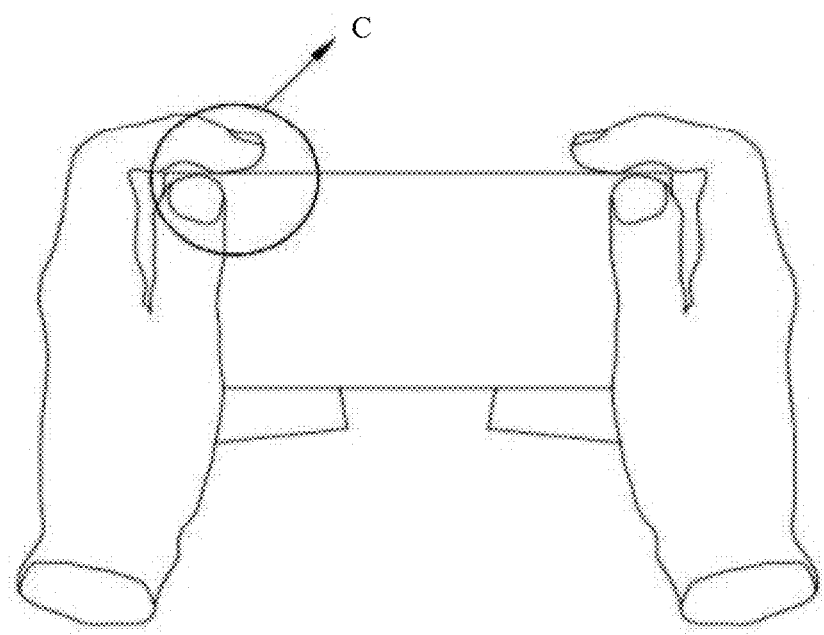
FIG. 6 is a diagram of an application scenario of an antenna apparatus in a landscape mode according to an embodiment.

In a specific operation process, especially in a landscape mode, as shown in FIG. 6, in this case, the mobile phone device is placed in a landscape mode, and holding with a hand blocks the antenna apparatus in a C area (the C area is where the antenna apparatus is installed). In this case, the control unit adjusts the capacitance adjustment apparatus or the inductance adjustment apparatus inside the first switch and the second switch, to change sensibility of the entire antenna unit, thereby adjusting a resonance frequency.

Figure 7:
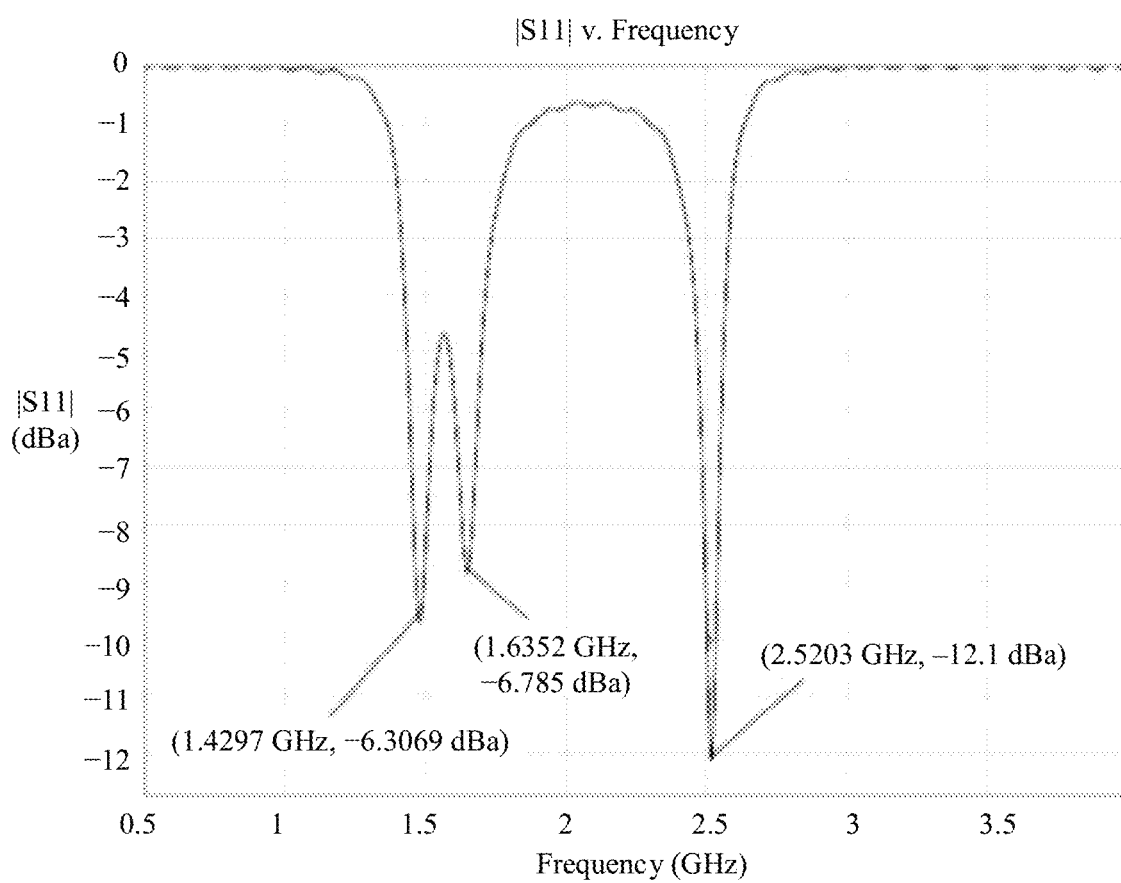
FIG. 7 is a diagram of a gain of an antenna apparatus according to another embodiment of the present invention.

Specifically, as shown in FIG. 7, the antenna apparatus is in the common mode, the differential mode, and a 1/4 mode (the 1/4 mode is a monopole mode from a feed point to an antenna end slot). Values of the common mode are 1.4297 GHz and −6.389 dBa, values of the differential mode are 1.6352 GHz and −6.785 dBa, and values of the 1/4 mode are 2.5203 GHz and −12.1 dBa.

Figure 8:
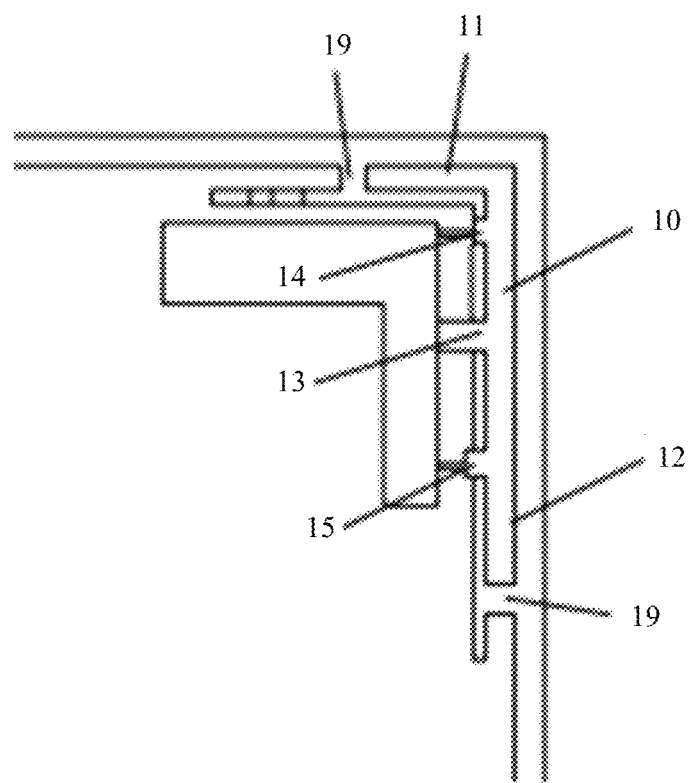
FIG. 8 is a diagram of a structure of an antenna apparatus according to an embodiment of the present invention.
Figure 9:
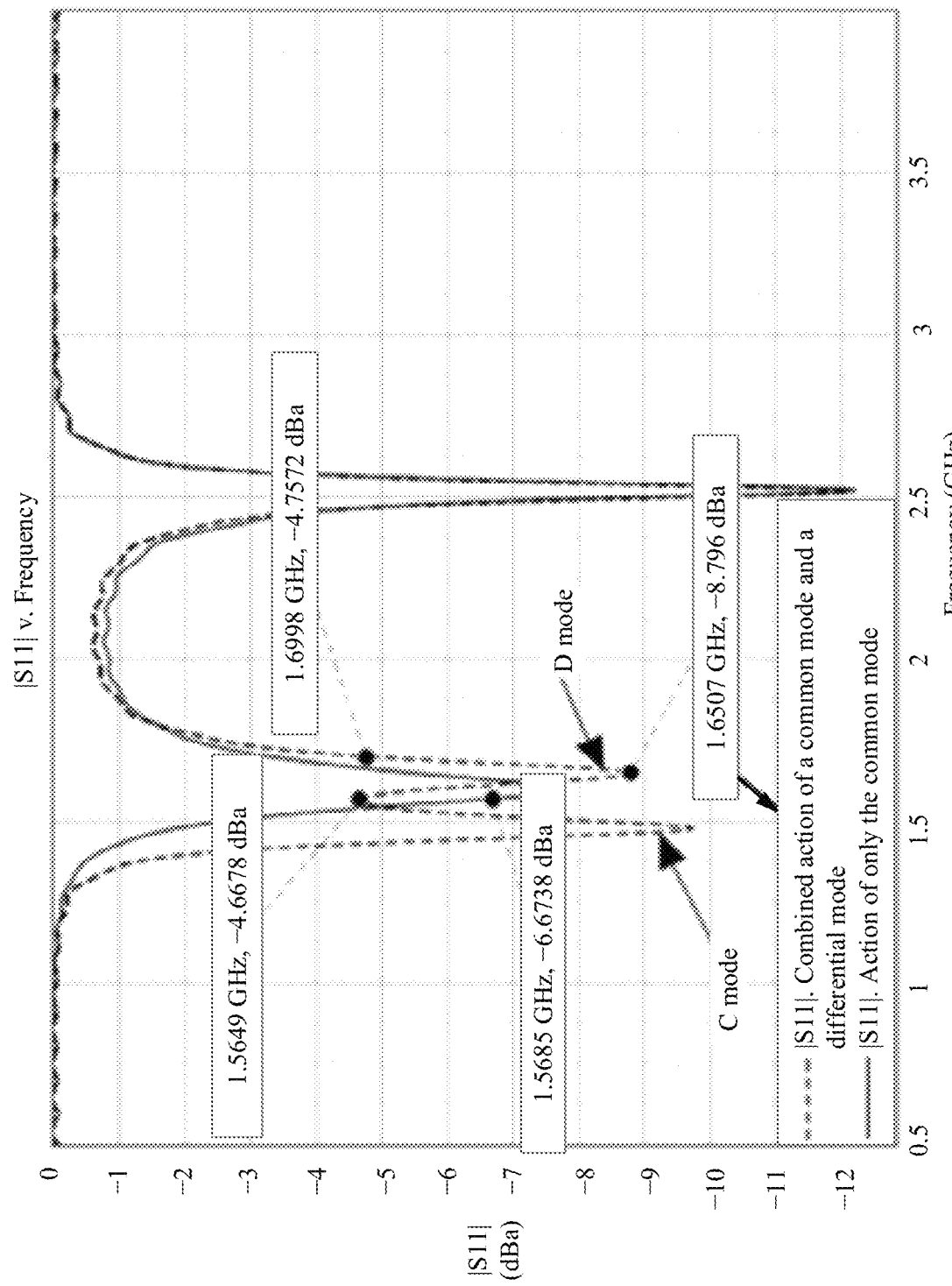
FIG. 9 is a diagram of a gain of an antenna apparatus according to another embodiment of the present invention.
Figure 10:
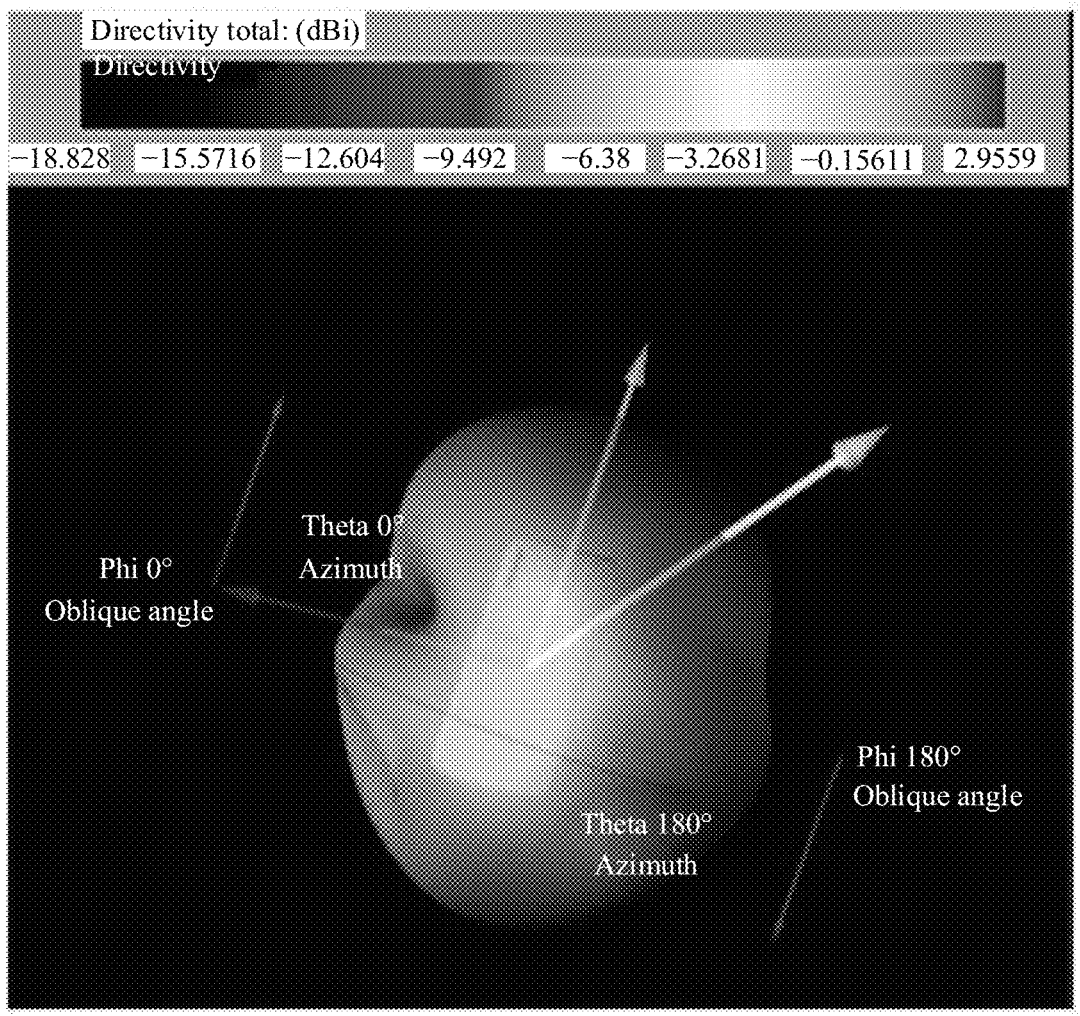
FIG. 10 is a pattern of an antenna apparatus according to an embodiment of the present invention.
Figure 11:
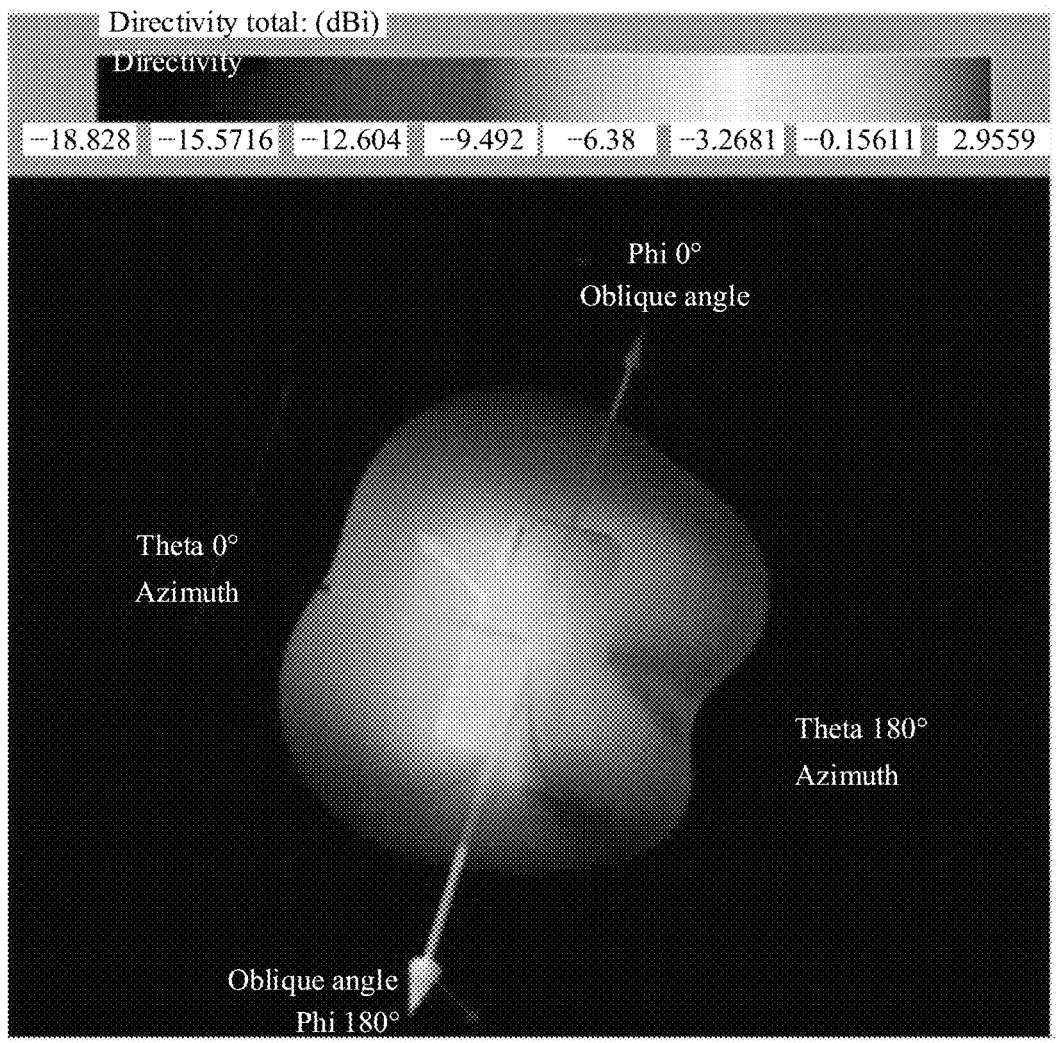
FIG. 11 is a pattern of an antenna apparatus according to another embodiment of the present invention.

For better understanding of impact on the antenna that is caused by adding a side slot, refer to FIG. 8 to FIG. 11 together. As shown in FIG. 8, slots 19 are added to ends of the first radiator section 11 and the second radiator section 12. Correspondingly, FIG. 9 is a diagram of data before and after the slots 19 are added. A solid line is a case in which the slots 19 are not added and the common mode (C mode) and the differential mode (D mode) are not excited. A dashed line is a case in which the slots 19 are added and the common mode (C mode) and the differential mode (D mode) are excited. It can be learned from the figure that performance of the antenna before and after the slots 19 are added is obviously different. FIG. 10 and FIG. 11 are respectively a pattern in which no slot 19 is added and a pattern in which a slot 19 is excited. It can be learned through comparison that a concave area in FIG. 10 is offset in FIG. 11. It should be noted that the concave area in the pattern means that signal radiation and receiving capabilities of the antenna device are weak herein. FIG. 11 fills the concave area in FIG. 10 by exciting the slot 19, to improve a signal receiving capability of the antenna device. The landscape-mode pattern of the antenna apparatus can be significantly improved by at least 20%, and a portrait-mode pattern is also improved by at least 5%.

Figure 12:
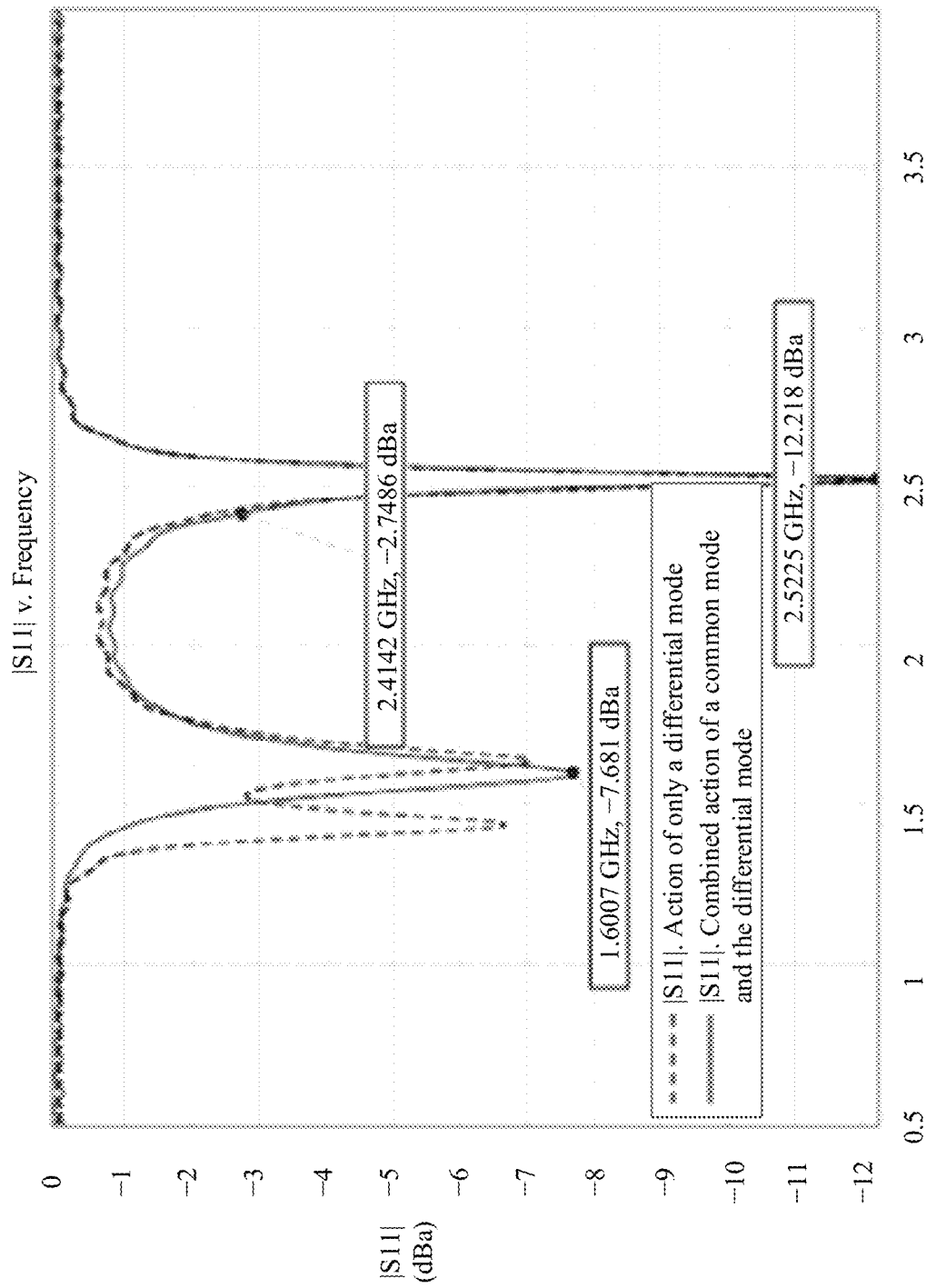
FIG. 12 is a diagram of a gain of an antenna apparatus according to another embodiment of the present invention.
Figure 13:
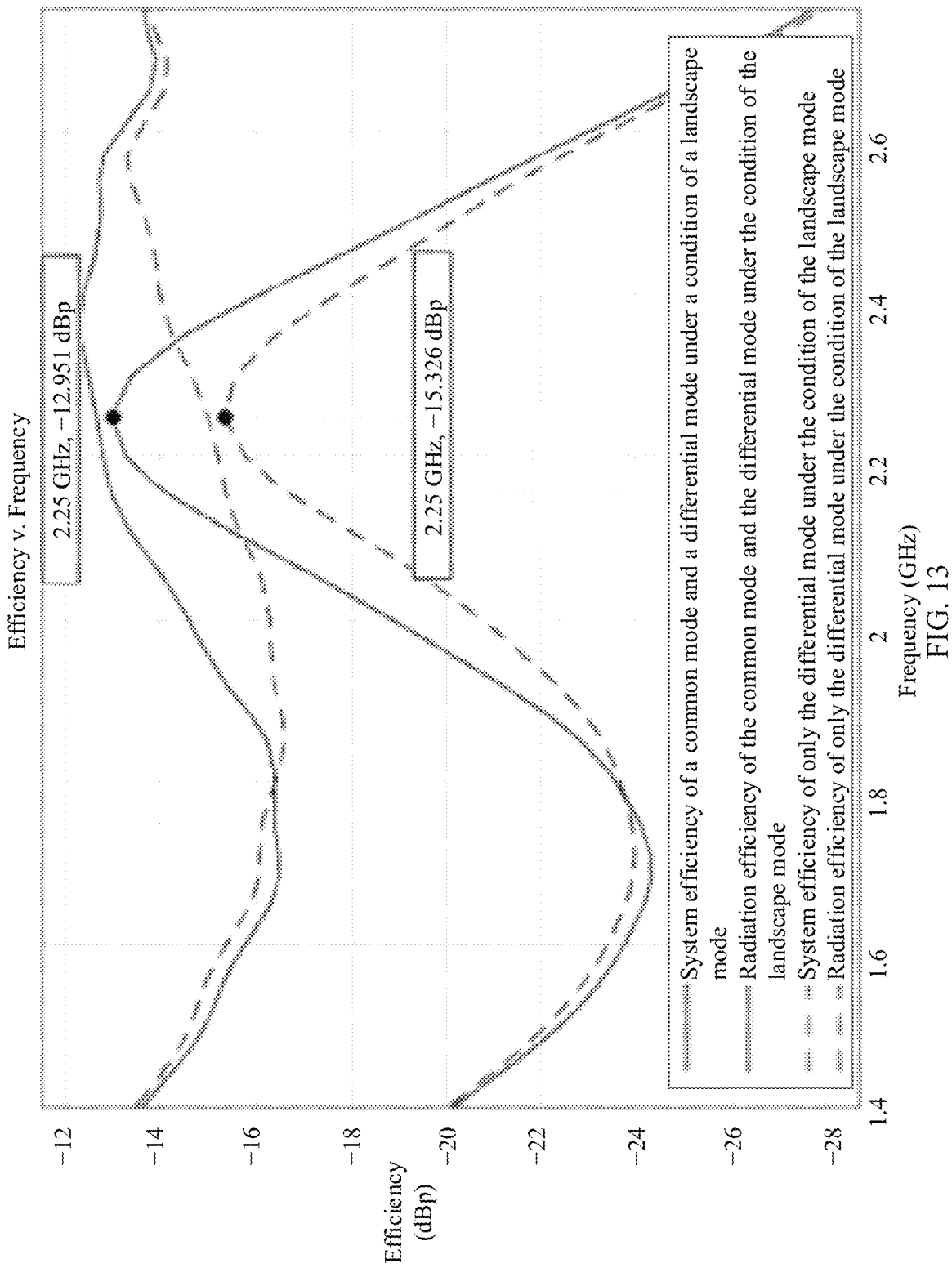
FIG. 13 is a diagram of a gain of an antenna apparatus according to another embodiment of the present invention.

As shown in FIG. 2, the first switch 17 and the second switch 18 are respectively disposed at ground points of the fourth radiator section 14 and the fifth radiator section, and the two switches include an inductance adjustment apparatus and a capacitance adjustment apparatus. By the first switch 17 and the second switch 18, the antenna device may be switched to a high-band Wi-Fi landscape mode, and current distribution inside the antenna unit is adjusted by the switch, to implement frequency tuning and change a band coverage range of the antenna apparatus. Specifically, as shown in FIG. 12 and FIG. 13, Wi-Fi landscape-mode performance is improved by 3 dB, and in a landscape and hand mode, an improvement is made to the hand mode by the D mode.

Figure 14:
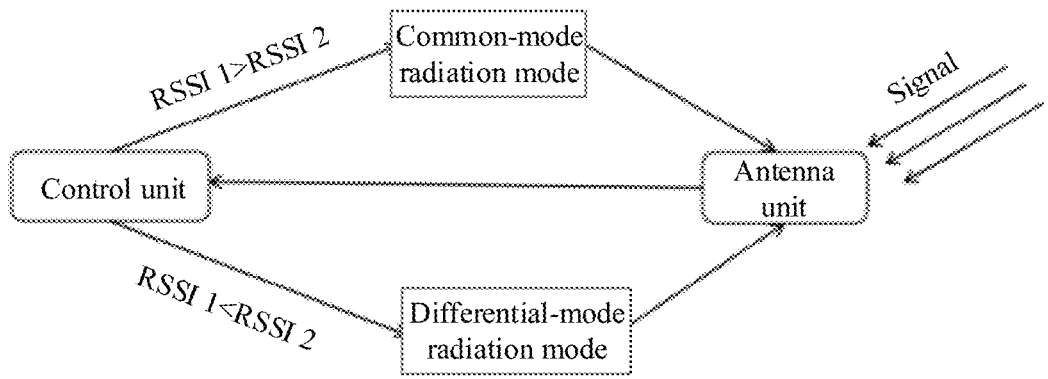
FIG. 14 is a diagram of a working principle of an antenna device according to an embodiment.

Specifically, as shown in FIG. 14, the control unit is configured to: identify a common-mode received signal strength (RSSI 1) of the antenna unit in the common mode and a differential-mode received signal strength (RSSI 2) in the differential mode, compare the RSSI 1 and the RSSI 2, and obtain a working mode switching signal based on a comparison effect of the RSSI 1 and the RSSI 2, to control the working mode of the antenna unit to be switched, so that antenna pattern reconstruction is implemented, and a capability of receiving a signal of the base station by the antenna device is improved.

In this application, a single-feed antenna apparatus with two radiation modes (the common mode and the differential mode) is designed to implement switching between the two radiation modes through virtual MAS, to change a pattern. Specifically, MAS (multiple antenna switching) refers to antenna switching tuning. Different antenna states are selected in different use cases to achieve an optimal solution. Virtual MAS means that a same antenna uses different antenna states in different scenarios to achieve an optimal solution. In this application, in a same antenna apparatus architecture, two radiation modes named the differential mode (C mode) and the common mode (D mode) are separately used to cover a same band, and switching between the C mode and the D mode is used to implement a low SAR and complement directivity. The SAR (Specific Absorption Ratio) refers to electromagnetic radiation energy absorbed by matter of a unit mass per unit of time. Generally, a value of the SAR is used internationally to measure a thermal effect of radiation of a terminal, to reflect adverse impact on a human body that is caused by radiation of the mobile phone.

In the foregoing architecture of the antenna apparatus 1, this application provides an antenna pattern reconstruction method, to reconstruct a pattern of a switched antenna apparatus, that is, to perform switching between a common mode and a differential mode of the antenna apparatus. Under a condition of a small clearance, in this application, the common mode and the differential mode are separately used for coverage in a same band to implement coverage of different patterns. Complementary coverage of spatial patterns of the common mode and the differential mode implements better antenna use experience.

It should be noted that band application scenarios of the antenna apparatus design for which the embodiment is applied may cover a 2G network, a 3G network, a 4G network, a 5G network, Wi-Fi, a GPS, Bluetooth, and the like.

Figure 15:
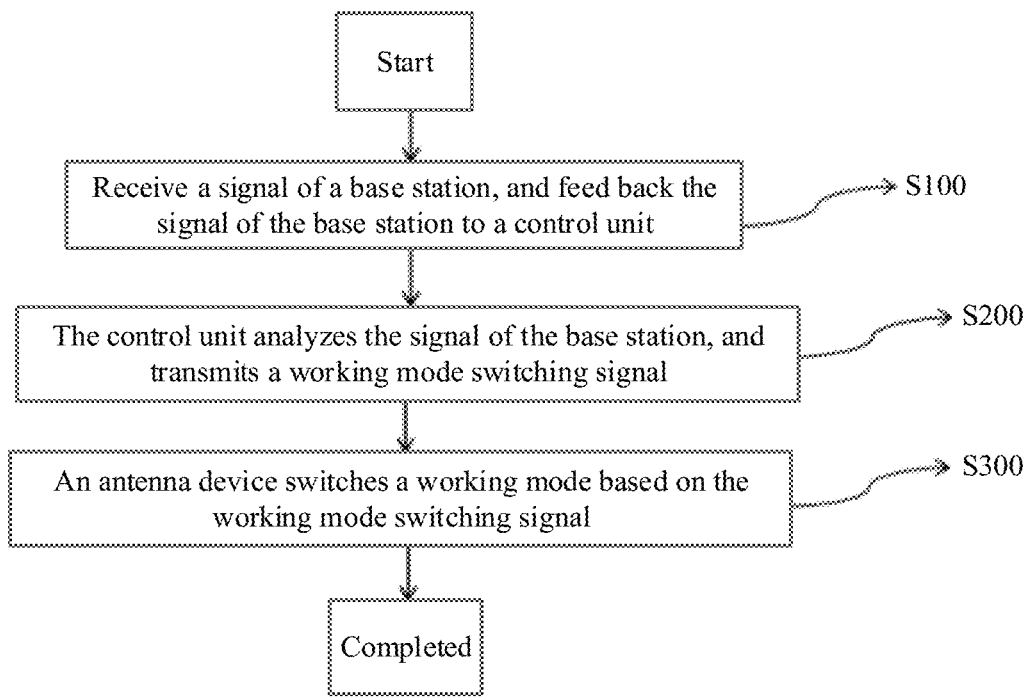
FIG. 15 is a flowchart of antenna pattern reconstruction according to an embodiment of the present invention.

With reference to FIG. 14 and FIG. 15, the antenna pattern reconstruction method includes the following steps.

S100: Receive a communication signal by an antenna unit of an antenna apparatus, and feed back the communication signal to a control unit, where the antenna apparatus includes one feed source that feeds the antenna unit to obtain a common mode and a differential mode.

It should be noted that the antenna apparatus is a signal transmitting and receiving unit of a communication device. The communication device herein may be an electronic device such as a mobile phone or a tablet computer. In this embodiment, a main function of the antenna apparatus is to receive a communication signal transmitted from a base station. A communication signal transmitted by the base station around the communication device is constantly obtained by the receiving function of the antenna apparatus, and the obtained communication signal is fed back to the control unit in the communication device.

S200: The control unit transmits a working mode switching signal to the antenna apparatus based on the feedback communication signal by the antenna apparatus. After obtaining the feedback communication signal by the antenna apparatus, the control unit analyzes the communication signal, and then transmits the working mode switching signal to the antenna apparatus based on an analysis result.

S300: The antenna apparatus switches a working mode based on the working mode switching signal transmitted by the control unit. The antenna apparatus selects the working mode based on the working mode switching signal. In this embodiment, the antenna apparatus has two working modes named the common mode and the differential mode. Patterns of the antenna apparatus in the two modes are different. Through selection of different working modes, a communication signal receiving capability of the antenna apparatus is improved.

Specifically, spatial distribution of the patterns of the antenna apparatus in the common mode and the differential mode is shown in FIG. 3b and FIG. 4b. The pattern when the antenna apparatus uses the common mode and the pattern when the antenna apparatus uses the differential mode are spatially orthogonal and complementary. Directions of strongest power (directions of arrows in the figures) in the pattern of the antenna apparatus in the common mode and the pattern in the differential mode are perpendicular to each other and spatially complementary, in other words, the two can more comprehensively cover a hemispherical area in which an antenna works. It can be learned from FIG. 3b and FIG. 4b that a main lobe of the pattern in the common mode and a main lobe of the pattern in the differential mode do not overlap. Spatial distribution areas of the two patterns are complementary, and occupy the hemispherical area surrounding the antenna apparatus, so that a communication signal receiving capability of the antenna apparatus is greatly improved.

In the mode switching-based pattern reconstruction solution provided in this application, the control unit performs selection from the two working modes of the antenna apparatus based on the communication signal, to implement pattern reconstruction of the antenna apparatus and improve a communication signal receiving capability of the antenna apparatus. It should be noted that, in this embodiment, the communication signal may be transmitted by the base station, or may be transmitted by another device that can transmit a signal, for example, a wireless router or a Wi-Fi hotspot.

Figure 16:
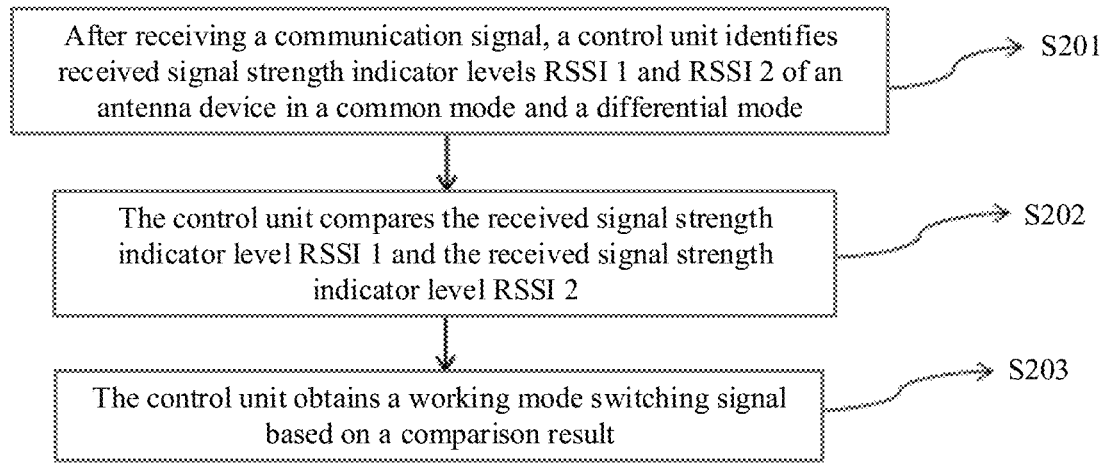
FIG. 16 is a flowchart of obtaining a working mode switching signal according to an embodiment of the present invention.

In a specific embodiment, as shown in FIG. 16, the step that the control unit transmits a working mode switching signal to the antenna apparatus based on the feedback communication signal by the antenna apparatus includes the following steps:

S201: After the control unit receives the feedback communication signal by the antenna apparatus, the control unit identifies a received signal strength indicator level RSSI 1 of the antenna apparatus in the common mode and a received signal strength indicator level RSSI 2 in the differential mode.

S202: The control unit compares the received signal strength indicator level RSSI 1 and the received signal strength indicator level RSSI 2.

S203: The control unit obtains the working mode switching signal based on a comparison result.

Specifically, the control unit performs analog calculation based on the feedback communication signal by the antenna apparatus, identifies received signal strength indicator levels RSSIs (Received Signal Strength Indication) of the antenna apparatus in different working modes. The RSSI represents a receiving capability of the antenna apparatus in a case of a current communication signal, the RSSI 1 represents a common-mode received signal strength, and the RSSI 2 represents a differential-mode received signal strength. It can be learned that communication signals are filled in an entire space range, but signal strengths in different areas are different, and signal receiving capabilities of the antenna apparatus in different areas are different. Taking a mobile phone as an example, when a person picks up a mobile phone to make a call, the mobile phone is close to a human ear, a head causes interference to signal reception of the mobile phone, and strengths of communication signals around an antenna apparatus of the mobile phone are different. In this case, for the antenna apparatus of the mobile phone, antenna patterns in the working mode named the common mode and the working mode named the differential mode are different. The pattern represents a direction in which energy is concentrated at a specific angle. In particular, in a main lobe area of the pattern, the antenna apparatus has strongest radiation and signal receiving capabilities. Therefore, using the common mode and the differential mode in which patterns are complementary implements a significant improvement to a signal receiving capability of the antenna in the hemispherical area. In a specific operation, the control unit calculates, based on the feedback communication signal, a signal distribution status around the antenna apparatus, and then simulates distribution statuses of patterns of the antenna apparatus in different working modes. Based on the communication signal distribution status, the control unit can obtain the RSSI 1 of the antenna apparatus in the common mode and the RSSI 2 in the differential mode. The control unit compares the RSSI 1 and the RSSI 2, and obtains the working mode switching signal based on the comparison result.

Figure 17:
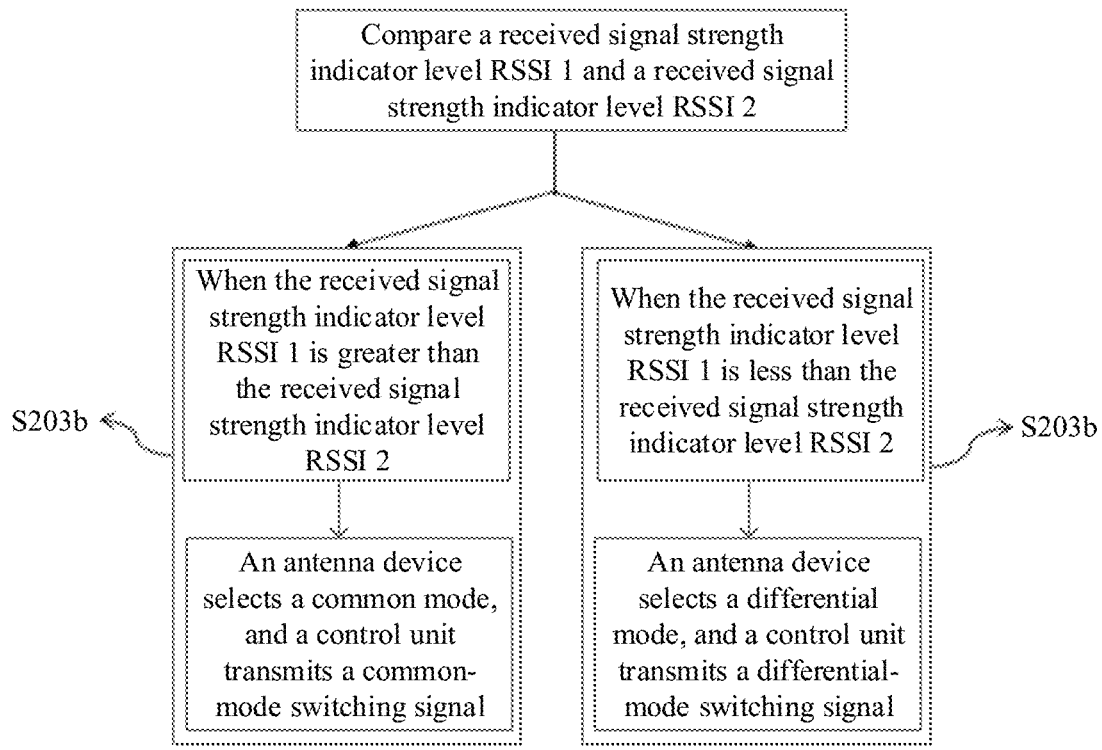
FIG. 17 is a flowchart of comparing received signal strengths according to an embodiment of the present invention.

In a specific embodiment, as shown in FIG. 17, the working mode switching signal includes a common-mode switching signal and a differential-mode switching signal. The step that the control unit obtains the working mode switching signal based on a comparison result includes the following steps:

S203a: When the common-mode received signal strength is greater than the differential-mode received signal strength, the antenna apparatus selects the common mode, and the control unit transmits the common-mode switching signal.

S203b: When the common-mode received signal strength is less than the differential-mode received signal strength, the antenna apparatus selects the differential mode, and the control unit transmits the differential-mode switching signal.

Specifically, the received signal strength indicator level RSSI reflects a signal receiving capability of the antenna apparatus in the two working modes that is obtained by the antenna apparatus based on current communication signal feedback. A signal receiving capability in the common mode is represented by the RSSI 1, and a signal receiving capability in the differential mode is represented by the RSSI 2. Comparing the RSSI 1 and the RSSI 2 is comparing the signal receiving capabilities in the two modes. When the RSSI 1 is greater than the RSSI 2, it means that the signal receiving capability of the antenna apparatus in the common mode is higher than the signal receiving capability of the antenna apparatus in the differential mode. In this case, the control unit transmits the common-mode switching signal, so that the antenna apparatus works in the common mode. When the RSSI 1 is less than the RSSI 2, it means that the signal receiving capability of the antenna apparatus in the common mode is lower than the signal receiving capability of the antenna apparatus in the differential mode. In this case, the control unit transmits the differential-mode switching signal, so that the antenna apparatus works in the differential mode.

In a specific embodiment, after obtaining the working mode switching signal, the antenna apparatus implements frequency tuning by a switch of the antenna apparatus. When the antenna apparatus selects a working mode under control of the control unit, the antenna apparatus can perform frequency tuning by controlling the switch of the antenna apparatus, to change a band coverage range of the antenna apparatus.

In a specific embodiment, the antenna apparatus feeds back the communication signal to the control unit at every interval of a fixed time, so that the control unit determines selection of the working mode at every interval of the fixed time, to implement polling switching of the antenna apparatus. In a specific embodiment, because communication signal distribution around the antenna apparatus constantly changes, and the communication signal distribution determines working mode selection of the antenna apparatus, a working mode of the antenna apparatus needs to be adjusted once a communication signal changes. Specifically, at every interval of a fixed time, the control unit obtains a feedback communication signal by the antenna apparatus. In this case, the control unit determines, based on the feedback communication signal, whether the antenna apparatus is to work in the common mode or the differential mode, so that a signal receiving capability of the antenna apparatus within the fixed time is strongest. Within a next fixed time, the control unit determines working mode selection of the antenna apparatus within the next fixed time based on a feedback communication signal at a next moment. By analogy, polling switching of the working mode of the antenna apparatus is implemented, so that it is ensured that working mode selection changes with communication signal distribution around the antenna apparatus.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna apparatus comprising:
   an antenna comprising:
      a first switch;
      a second switch;
      a first radiator section;
      a second radiator section coupled to the first radiator section to form a junction;
      a third radiator section that comprises a first side and a second side, is coupled to the junction, and is grounded;
      a fourth radiator section disposed on the first side and grounded by the first switch; and
      a fifth radiator section disposed on the second side and grounded by the second switch,
      wherein the third radiator section, the fourth radiator section, and the fifth radiator section are distributed on a same side of the first radiator section and the second radiator section and extend at an included angle from the first radiator section and the second radiator section; and
   a feed source electrically coupled to the fourth radiator section and configured to feed the antenna.

2. The antenna apparatus of claim 1, wherein the antenna is configured to operate interchangeably in a common mode and a differential mode, and wherein the antenna apparatus further comprises a controller electrically coupled to the feed source and configured to switch the antenna between the common mode and the differential mode.

3. The antenna apparatus of claim 2, wherein the controller is further configured to:
   identify a common-mode received signal strength of the antenna in the common mode and a differential-mode received signal strength in the differential mode;
   compare the common-mode received signal strength and the differential-mode received signal strength to obtain a comparison result; and
   obtain a working mode switching signal based on the comparison result.

4. The antenna apparatus of claim 2, wherein, in the common mode, a first current direction of the first radiator section is in a first direction from the first radiator section to the second radiator section and a second current direction of the second radiator section is in a second direction from the second radiator section to the first radiator section, and wherein, in the differential mode, a third current direction of the first radiator section is in the first direction and a fourth current direction of the second radiator section is in the first direction.

5. The antenna apparatus of claim 1, wherein the first switch and the second switch comprise a capacitance adjustment apparatus or an inductance adjustment apparatus that is configured to perform frequency tuning of the antenna apparatus.

6. The antenna apparatus of claim 1, further comprising:
   a first slot disposed at a first end of the first radiator section that is away from the second radiator section; or
   a second slot disposed at a second end of the second radiator section that is away from the first radiator section.

7. The antenna apparatus of claim 1, wherein the third radiator section is located at a middle position of the antenna.

8. An antenna pattern reconstruction method comprising:
   receiving, by an antenna of an antenna apparatus, a communication signal;
   feeding back, by the antenna, the communication signal to a controller of the antenna apparatus;
   controlling, by the controller and based on the communication signal, a first switch and a second switch of the antenna,
   wherein the antenna further comprises:
      a first radiator section;
      a second radiator section coupled to the first radiator section to form a junction;
      a third radiator section that comprises a first side and a second side, is coupled to the junction, and is grounded;
      a fourth radiator section disposed on the first side and grounded by the first switch; and
      a fifth radiator section disposed on the second side and grounded by the second switch,
      wherein the third radiator section, the fourth radiator section, and the fifth radiator section are distributed on a same side of the first radiator section and the second radiator section and extend at an included angle from the first radiator section and the second radiator section.

9. The antenna pattern reconstruction method of claim 8, further comprising switching, through the first switch and the second switch and based on a working mode switching signal, a working mode of the antenna between a common mode and a differential mode.

10. The antenna pattern reconstruction method of claim 9, further comprising:
    identifying, by the controller after receiving the communication signal, a common-mode received signal strength of the antenna in the common mode and a differential-mode received signal strength in the differential mode;
    comparing, by the controller, the common-mode received signal strength and the differential-mode received signal strength to obtain a comparison result; and
    obtaining, by the controller and based on the comparison result, the working mode switching signal.

11. The antenna pattern reconstruction method of claim 10, wherein the working mode switching signal comprises a common-mode switching signal and a differential-mode switching signal, and wherein the antenna pattern reconstruction method further comprises:
    when the common-mode received signal strength is greater than the differential-mode received signal strength:

selecting, by the antenna apparatus, the common mode; and transmitting, by the controller, the common-mode switching signal; and when the common-mode received signal strength is less than the differential-mode received signal strength:

selecting, by the antenna apparatus, the differential mode; and transmitting, by the controller, the differential-mode switching signal.

12. The antenna pattern reconstruction method of claim 9, further comprising:

producing, by the antenna, a first pattern of the antenna apparatus when the antenna apparatus uses the common mode; and producing, by the antenna, a second pattern of the antenna apparatus when the antenna apparatus uses the differential mode, wherein the first pattern and the second pattern are spatially orthogonal and complementary.

13. The antenna pattern reconstruction method of claim 8, further comprising further controlling, by the controller and based on the communication signal, the first switch and the second switch to implement frequency tuning.

14. The antenna pattern reconstruction method of claim 8, further comprising feeding back, by the antenna apparatus, the communication signal to the controller at every interval of a fixed time.

15. A communication device comprising:

an antenna comprising:
    a first switch;
    a second switch;
    a first radiator section;
    a second radiator section coupled to the first radiator section to form a junction;
    a third radiator section that comprises a first side and a second side, is coupled to the junction, and is grounded;
    a fourth radiator section disposed on the first side and grounded by the first switch; and
    a fifth radiator section disposed on the second side and grounded by the second switch,
    wherein the third radiator section, the fourth radiator section, and the fifth radiator section are distributed on a same side of the first radiator section and the second radiator section and extend at an included angle from the first radiator section and the second radiator section; and a circuit board comprising a feed source disposed on the circuit board, wherein the feed source is electrically coupled to the fourth radiator section to feed the antenna, and wherein the first switch and the second switch are disposed on the circuit board.

16. The communication device of claim 15, wherein the antenna is configured to operate interchangeably in a common mode and a differential mode, wherein the communication device further comprises a controller disposed on the circuit board and electrically coupled to the feed source, wherein the controller is configured to switch the antenna between the common mode and the differential mode, wherein, in the common mode, a first current direction of the first radiator section is in a first direction from the first radiator section to the second radiator section and a second current direction of the second radiator section is in a second direction from the second radiator section to the first radiator section, and wherein, in the differential mode, a third current direction of the first radiator section is in the first direction and a fourth current direction of the second radiator section is in the first direction.

17. The communication device of claim 16, wherein the controller is further configured to:

identify a common-mode received signal strength of the antenna in the common mode and a differential-mode received signal strength in the differential mode;

compare the common-mode received signal strength and the differential-mode received signal strength to obtain a comparison result; and obtain, based on the comparison result, a working mode switching signal.

18. The communication device of claim 15, wherein the first switch and the second switch comprise a capacitance adjustment apparatus or an inductance adjustment apparatus that is configured to perform frequency tuning of the antenna.

19. The communication device of claim 15, wherein the antenna further comprises:

a first slot disposed at a first end of the first radiator section that is away from the second radiator section; or a second slot disposed at a second end of the second radiator section that is away from the first radiator section.

20. The communication device of claim 15, wherein the third radiator section is located at a middle position of the antenna.

* * * * *